United States Patent [19]

Wittenberg et al.

[11] 4,110,040

[45] Aug. 29, 1978

[54] EXPOSURE SYSTEM FOR ELECTROPHOTOGRAPHIC COPIER

[75] Inventors: Albert Jan Wittenberg, Velden; Guido J. M. van der Velden, Valkenswaard, both of Netherlands

[73] Assignee: Océ-van der Grinten N.V., Venlo, Netherlands

[21] Appl. No.: 737,048

[22] Filed: Oct. 29, 1976

[30] Foreign Application Priority Data

Apr. 20, 1976 [NL] Netherlands ........................ 7604118

[51] Int. Cl.[2] ........................ G03B 27/54; G03B 27/32; G03G 15/00

[52] U.S. Cl. ........................ 355/70; 355/3 R; 355/77

[58] Field of Search ........................ 355/3 R, 11, 67, 70, 355/104, 110, 111, 117, 8, 77

[56] References Cited

U.S. PATENT DOCUMENTS

| | | | |
|---|---|---|---|
| 3,044,351 | 7/1962 | Patterson | 355/70 X |
| 3,094,909 | 6/1963 | Szekeres | 355/3 R |
| 3,207,050 | 9/1965 | Limberger | 355/11 |
| 3,330,180 | 7/1967 | Ferguson et al. | 355/11 X |
| 3,498,714 | 3/1970 | Elmer | 355/70 |
| 3,709,603 | 1/1973 | Furuichi | 355/3 R X |

FOREIGN PATENT DOCUMENTS

| | | | |
|---|---|---|---|
| 22,904 | 5/1966 | Japan | 355/104 |

*Primary Examiner*—Fred L. Braun
*Attorney, Agent, or Firm*—Albert C. Johnston

[57] ABSTRACT

An exposure system for electrophotographic copiers, by which large originals such as engineering drawings can be exposed at high light intensity yet with the space requirement held to a minimum. The exposure is obtained by the provision of at least one tubular light source disposed parallel to a slit exposure zone at the side of that zone facing away from the image projection (optical) system and, at the side thereof facing toward the optical system, of tubular light sources disposed parallel to said zone in two equal groups arranged opposite to one another and adjacent to the reflection object space of the exposure system. The lamps of each of the two groups are closely spaced and have disposed closely about them a diffusely reflecting wall of a form generated by a straight line moving parallel to the lamps. The wall extends at one end at least to the vicinity of the exposure zone and at its opposite end extends at least to the reflection object space but not farther than the object space of the exposure system.

5 Claims, 2 Drawing Figures

EXPOSURE SYSTEM FOR ELECTROPHOTOGRAPHIC COPIER

Figure 1:
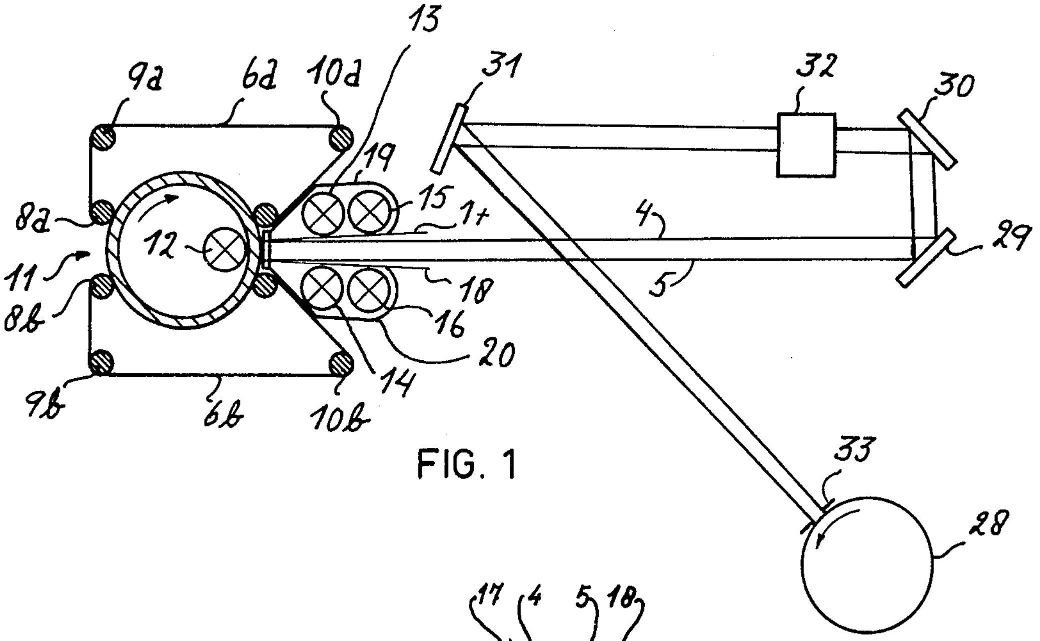

This invention relates to an exposure device or system for an electrophotographic copier, of the type having a slot-shaped exposure zone, light sources for illuminating an original or a portion thereof in the exposure zone, and an optical system for projecting an image from the exposure zone into an image plane.

In copiers for relatively small-size origninals, e.g., size A4 originals, an exposure device of that type is often moved along a stationary original, the original thus being exposed strip by strip, and a resulting light image is projected strip by strip to a moving photoconductive material by way of a moving optical system of lenses and mirrors.

In copiers suitable for copying large-size originals, e.g., of between A0 and A2 in size, an exposure device of the type mentioned usually has a fixed optical system, and the original to be copied is carried at constant speed along the exposure zone, thus being exposed strip by strip. When a fixed optical system is used, a full electrostatic image of the original can be formed on a photoconductive material by carrying this material in a charged state along the image area at an adapted speed. Notwithstanding the use of a slit-exposure system, whose exposure zone usually is not wider than a few centimeters, the conventional exposure systems for copying large-size originals generally take up considerable space.

The present invention provides an exposure system suitable for large-size originals, by which a maximum light intensity can be attained in the exposure zone yet the space requirement is held to a minimum.

According to this invention, an exposure system of the type above mentioned is provided in which (a) at the side of the exposure zone facing away from the optical system there is arranged a first exposure system comprising a tubular light source disposed parallel to the longitudinal center line, or axis, of the exposure zone;

(b) at the side of the exposure zone directed toward the optical system there is arranged a second exposure system comprising at least four tubular light sources which are disposed parallel to the longitudinal center line, or axis, of the exposure zone in two equal groups opposite to one another, with all these light sources lying adjacent to the reflection object space;

(c) each group of light sources in the second exposure system has a curved diffusely reflecting wall disposed about the group of light sources, which wall has the form of a surface generated by a straight line moving parallel to the light sources, and one edge of this wall extends at least to the vicinity of the exposure zone while the opposite edge thereof, at the side of the group of light sources directed toward the optical system, extends at least as far as the reflection object space and at most as far as the object space; and (d) the first and second exposure systems are provided with means permitting simultaneous activation of the light sources of the two systems.

The term "object space" as used herein means, as usual, the space at the object side of the optical system that is occupied by the beams of light participating in the formation of the image. The term "reflection object space" as used herein means that space (inclusive of the object space) in which an object or a part of it can be imaged directly or through specular reflection in the exposure zone, in the image space or in the extension of the image space behind the image plane. The term "image space" as used herein means the space at the image side of the optical system that is occupied by the beams of light participating in the formation of the image.

In it simplest embodiment the first exposure system may consist of a single tubular light source centrally disposed behind the exposure zone, but it may also consist of more light sources arranged near the exposure zone, symmetrically with respect to its longitudinal center line. This first system, if desired, may also be provided with one or more diffusely reflecting reflectors.

Preferably, the light sources of the second exposure system are disposed as closely as practicable to the exposure zone, so that the light sources nearest to the exposure zone are not more than 7 cm removed from it, as measured between the respective center lines of these light sources and the exposure zone. The other light sources of the second exposure system, all of which lie adjacent to the reflection object space, are located at the side of the preceding light sources facing away from the exposure zone and, preferably, they are closely spaced. By "closely spaced" as here used is meant a spacing generally not exceeding 10 mm and, preferably, of between 1 and 5 mm, measured over the shortest distance between the walls of the light sources.

As previously stated, all the light sources of the second exposure system are to lie adjacent to the reflection object space. In this regard, the shortest distance between the walls of the lamps and the reflection object space should not exceed a few millimeters.

Preferably, the diffusely reflecting walls are arranged at short distance from the light sources and, preferably, they extend about the lamps over the shortest practicable distance. The object of this arrangement is to enclose the light sources in the smallest practicable space having the smallest practicable diffusely reflecting surface, while leaving sufficient spacing between the walls and the light sources so as to be able to carry off the heat produced, via air ventilation. Again, "short distance" is used here to mean a spacing generally not exceeding 10 mm but, preferably, of between 1 and 5 mm, measured over the shortest distance between the walls of the light sources and the reflecting wall.

The surface of the diffusely reflecting walls is preferably formed by a white coating having a mat surface structure, and the light sources preferably are tubular fluorescent lamps having at least the same length as the exposure zone.

The invention will be further evident from the following description and the accompanying drawing of an illustrative embodiment of the improved exposure system.

Figure 2:
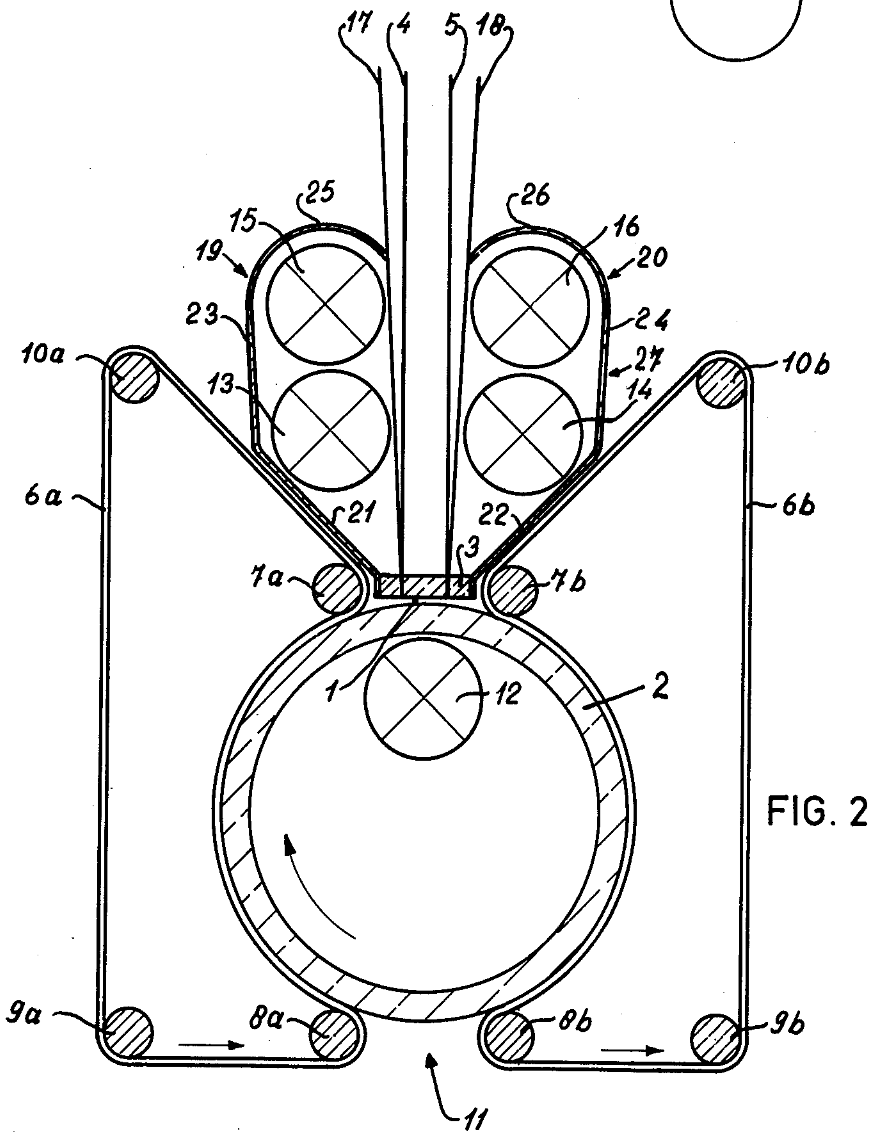

In the drawing:

FIG. 1 is a schematic view, partly in cross section, of the whole exposure system; and FIG. 2 is a schematic cross-sectional view, on an enlarged scale, of the apparatus or device according to the invention by which the exposure of originals is effected.

Referring to FIG. 2, a slot-shaped, or slit, exposure zone 1 is formed between a rotatably mounted transparent cylinder 2 (which in an alternative embodiment may be matted) and a stationary transparent strip 3 which is of the same length as the cylinder 2 and is arranged parallel to the axis of this cylinder in close proximity to the surface thereof.

The area of the exposure zone 1 is bounded by a beam of rays 4, 5 forming the object space. As shown in FIG. 1 said beam is projected onto a photoconductive drum surface 28, through a slot in a mask 33 arranged at a short distance from said surface, by means of three mirrors 29, 30 and 31 and an optical system 32. In order to avoid need for a long actual copier length, the light beam is folded by arranging the mirrors 29 and 30 perpendicular to each other in such a position that they reflect the beam through the optical system 32 in a direction opposite to the original direction. The mirror 31 then reflects the beam from the optical system to the photoconductive drum 28.

The structure of the exposure device proper, as shown best in FIG. 2, includes an endless belt 6*a* which is trained over four rollers 7*a*, 8*a*, 9*a* and 10*a*, and an endless belt 6*b* trained over the four rollers 7*b*, 8*b*, 9*b* and 10*b*. A length or flight of each of these belts extends in a path between two rollers (7*a*, 8*a*, and 7*b*, 8*b*, respectively) so as to engage against nearly half the surface of the cylinder 2, leaving uncovered only a strip of the cylinder surface bounded by the rollers 7*a* and 7*b*, which curves through the exposure zone 1, and a strip 11 thereof bounded by the rollers 8*a* and 8*b* opposite to the exposure zone. With the parts being driven, an original can be fed in at strip 11 and will be carried between the cylinder and one endless belt to and through the exposure zone, and then carried back between the cylinder and the other belt to the open strip 11, where the original can be removed from the cylinder. When the cylinder and the endless belts move in the directions indicated by the arrows, the original is fed in at roller 8*a*, and fed out at roller 8*b*.

A tubular light source 12 such as a fluorescent lamp tube is arranged inside the cylinder 2 yet near to the exposure zone 1 and parallel to the axis of the cylinder. Outside the cylinder, four tubular light sources, such as substantially identical fluorescent tubes 13, 14, 15 and 16, are arranged parallel to the axis of the cylinder in two group pairs lying on two opposed sides of the reflection object space 17, 18 and all nearly abutting said space. The lamps 13 and 14, i.e., one lamp of each group, are arranged opposite to one another near the longitudinal sides of the exposure zone, whereas the other two lamps 15 and 16 are arranged at the sides of the lamps 13 and 14 facing away from the exposure zone.

Diffusely reflecting reflector walls 19 and 20 are arranged about the respective lamp groups 13, 15 and 14, 16. Each of these walls comprises a curved plate which is shaped so as to lie near to the associated lamp group and which has a reflective white coating on its side directed toward the lamps. One edge of each plate extends to the proximity of the exposure zone, while the opposite edge, which is located at the side of the lamps facing away from the exposure zone, extends to the border 17 or 18 of the reflection object space. Viewed from the exposure zone, each plate comprises, successively, a first flat portion 21 or 22 inclined at an angle of about 45° to the long sides of the object space, a second flat portion 23 or 24 lying in a plane substantially parallel to the long sides of the object space, and a cylindrical portion 25 or 26 the axis of which coincides with the axis of the associated lamp (15 or 16) most remote from the exposure zone.

The spacing either between two lamps of a group or between these lamps and the associated diffusely reflecting wall amounts to 1–3 mm, measured over the shortest distances between the objects. The lamps 13 and 14 nearest to the exposure zone are positioned at a distance of 6 1 cm from said zone, measured between the respective center lines of the lamps and the exposure zone. At a given diameter of 38 mm for the fluorescent lamps, said distance is the shortest one possible while maintaining a ventilating space between the lamps and the reflector walls. By means of a fan (not shown) the space inside the reflector walls is cooled with air flowing through an opening 27 provided in the second flat portion (e.g., 24) of one of the reflector walls.

The ends of the spaces inside the walls 19 and 20, at either end of the lamps therein, are closed by flat, specularly reflecting walls arranged perpendicular to the axis of said lamps so that, optically, each lamp is extended by itself. This avoids decreased light intensity in the exposure zone near the ends of the lamps.

In the exposure device according to the invention the ratio of light intensities at the front and the back of the original can be controlled, for instance, by changing the effective voltage of the light sources positioned in front of or behind the original, or by changing the distance between the light source behind the original and the original. It has been found possible to adjust the intensity ratio so that the exposure time of various originals having different transparencies remains the same. Thus, the exposure device will serve well for copying an original consisting of white drawing paper weighing 80 grams, in which case approximately 25% of the brightness of the background emanates from the exposure system provided at the back of the original; and for copying an original that is a drawing on a semi-transparent foil, with approximately 50% of the brightness of the background emanating from the exposure system provided at the back of the original; and for copying a drawing on a transparent foil, in which case the background brightness emanation amounts to approximately 75%. Since copiers for A3 and larger sizes are used mainly for copying engineering drawings, originals of the kind referred to are the most usual ones for such apparatus. Of course, the exposure system provided at the back of the original may be constructed so that it can be switched off, making it possible if need should arise to copy an original bearing an image on both sides.

The exposure device according to the invention also makes it possible to discharge the border of an original effectively without any further provision. When copying an original which is narrower than the length of the exposure zone, the areas of that zone which are not covered by an original and the corresponding areas in the image plane will be illuminated at high intensity and thus discharged. Similarly, the areas of the photoconductive element adjoining the leading and trailing edges of the image will be illuminated by leaving the light sources active when no original is passing the exposure zone.

What is claimed is:

1. In an exposure device for an electrographic copier, including means defining a slot-shaped zone for stripwise exposure of an original or a portion thereof, light sources for illuminating the exposure zone, and an optical system for projecting an image from said exposure zone into an image plane, there being at the object side of the optical system an object space occupied by the beams of light that participate in the formation of the image and a reflection object space, inclusive of the object space, in which an object or a portion thereof in the exposure zone is imagable directly or by specular reflection, the improvement which comprises (a) at the side of said exposure zone facing away from said optical system, a first exposure system comprising a tubular light source disposed parallel to the longitudinal axis of said exposure zone;

(b) at the side of said exposure zone directed toward said optical system, a second exposure system comprising at least four tubular light sources which are disposed parallel to the longitudinal axis of said exposure zone in two equal groups opposite to one another, all these light sources lying outside but adjacent to the reflection object space; and (c) a diffusely reflecting wall disposed about the light sources of each said group of light sources, each said wall having the form of a surface generated by a straight line moving parallel to said light sources, and extending at one end thereof at least to the vicinity of said exposure zone, and extending at the opposite end thereof, at the side of the related group of light sources toward said optical system, at least as far as the reflection object space and at most as far as the object space.

2. Exposure device according to claim 1, that light source of each said group which is disposed most closely to said exposure zone being not more than 7 cm removed therefrom, as measured between the respective longitudinal axes of the light source and said exposure zone, and every subsequent light source and the preceding one being closely spaced.

3. Exposure device according to claim 1, each of said light sources being a fluorescent lamp tube having a length at least as great as the length of said exposure zone, the inner surface of each of said diffusely reflecting walls being formed by a white coating having a mat surface structure, and said walls being arranged at a short distance from the respective light sources inside them.

4. Exposure device according to claim 1, said second exposure system consisting of four of said tubular light sources with two of them in each of said groups, each of said light sources being a fluorescent lamp tube having a length at least as great as the length of said exposure zone.

5. Process for exposing an original, which comprises, while passing the original through the exposure zone of an exposure device according to claim 1, exposing a strip of the original in said zone, at the back and at the front of the strip simultaneously, to light from the light sources of said first and said second exposure systems.

* * * * *